United States Patent Office 3,281,377
Patented Oct. 25, 1966

3,281,377
AQUEOUS SUSPENSION POLYMERIZATION CONTAINING GRAFT POLYMERS OF POLYALKYLENE GLYCOL/VINYL COMPOUNDS AND DERIVATIVES THEREOF, AS DISPERSANTS
Michael Lederer, Karl-Heinz Kahrs, and Johann Wolfgang Zimmermann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 8, 1961, Ser. No. 94,132
Claims priority, application Germany, Mar. 9, 1960, F 30,712
13 Claims. (Cl. 260—2.5)

The present invention relates to a process for the polymerization of vinyl compounds.

The polymerization on an industrial scale of vinyl compounds, especially vinyl chloride, is advantageously carried out in emulsion or aqueous suspension. The two processes differ in the way the polymerization is started and in the nature of the dispersant used. In the emulsion polymerization, the reaction is started by means of water-soluble peroxidic catalysts, for example of the potassium persulfate type. The suspension polymerization is started with the help of monomer-soluble catalysts, for example diacyl peroxides of the benzoyl peroxide type. In the emulsion polymerization, the monomers are dispersed by means of typical emulsifiers, for example sodium salts of fatty alcohol sulfonates. In the suspension polymerization, various compounds are used as disperants. By using, for example, inorganic solids such as calcium phosphate, calcium oxalate, barium sulfate, kaolin or bentonite, the monomer droplets are prevented from coalescing in the course of the polymerization. These inorganic dispersants may be combined with small amounts of emulsifier.

Small additions of silicone oils have been claimed to be advantageous. It has also been proposed to use metal hydroxides, for example those of zinc or aluminum. All these substances have the disadvantage, however, that they cannot be removed completely from the polymer and therefore impair the properties of the latter, for example the transparency of molding materials.

It is also known to use water-soluble high molecular weight compounds such as polyvinyl alcohol, methyl cellulose and gelatin for making suspension polymers.

To influence the particle sized distribution in polymers, graft copolymers which are obtained by copolymerization of an olefinic compound in the presence of a pre-formed polymer, have been used as dispersants. This process, however, leads to undesired low conversions per unit of time and volume owing to the necessary wide phase proportion of monomer:water (about 1:4).

It is furthermore known to use derivatives of polyethers such as polyethylene glycol carboxylic acid as emulsifiers for the emulsion polymerization.

When in the suspension polymerization pure polyethers are used as dispersants, strong formation of deposits occurs in the polymerization vessel.

Now we have found that a new class of compounds of modified polyethers, for example polyalkylene glycols, is particularly suitable for use as dispersants for the suspension polymerization of vinyl compounds.

These new compounds are high molecular weight compounds whose basic skeleton consists of a polyether, for example polyethylene glycol, ethylene glycol/propylene glycol copolymers or polyglycols whose terminal hydroxyl groups have been esterified or etherified, and onto the basic skeleton of which vinyl compounds are grafted, for example vinyl acetate, vinyl propionate, vinyl butyrate, vinyl octoate, acrylic esters, methacrylic esters or other polymerizable monomers.

The graft polymers used in accordance with the present invention may be obtained, for example, by the process described in German Patent 1,077,430, of April 15, 1958. Alternatively, they may be obtained in accordance with U.S. patent application Ser. No. 78,813, filed on December 28, 1960, and now abandoned, by graft-polymerizing vinyl esters, acrylic acid esters or methacrylic acid esters or mixtures of these monomers, if desired in combination with other copolymerizable compounds, on to polyalkylene glycols or polyalkylene glycol derivatives in the presence of free radical-liberating polymerization catalysts and/or by irradiation, the amount of polyalkylene glycol or polyalkylene glycol derivative ranging from 50 to 99.9% by weight, calculated on the reaction mixture.

The terminal hydroxyl groups of the polyethers forming the basic skeleton of the graft polymers to be used in accordance with the invention may be esterified with aliphatic, aromatic or hydroaromatic carboxylic acid radicals or etherified with alkoxy or phenoxy groups containing 1 to 20 carbon atoms. Advantageously, they contain fatty acid radicals containing 2 to 6 carbon atoms, for example an acetic acid, propionic acid or butyric acid radical, or alkoxy groups containing 1 to 4 carbon atoms such as the methoxy-, ethoxy- or propoxy groups.

The molecular weight of the graft polymers to be used ranges from about 1,000 to about 40,000, advantageously from 10,000 to 30,000.

The suitability of these compounds as dispersants for the suspension polymerization depends to a large extent on the ratio of polyether:vinyl compound. This ratio influences the formation of deposits in the polymerization vessel and, in the case of vinyl compounds whose polymers are insoluble in the monomer, such as vinyl chloride, it influences the formation of polymer particles of porous structure. The formation of deposits in the polymerization vessel is of interest from a technical viewpoint.

The formation of deposits is undesired because it interferes, for example, with the elimination of heat and leads to a contamination of the polymers. The obtainment of a polymer grain of a desired, for example porous, structure is important for the processing of the polymer. For example, in the case of polyvinyl chloride, plasticizers and stabilizers are admixed with the polymer powder prior to processing. These plasticizers and stabilizers are advantageously distributed on the polymer particles as quickly as possible. Especially suitable are therefore polymers whose particles are of porous structure. If the dispersant is a modified polyether containing 10 to 50%, advantageously 15 to 35%, of the aforesaid vinyl compound, a polymer of particularly porous structure is obtained and, simultaneously, only slight formation of deposits occurs in the polymerization vessel.

The above-mentioned modified polyethers are added in an amount of 0.01 to 2%, preferably 0.1 to 1%, to the water used in the suspension polymerization, the percentage figures being calculated on the monomer. If desired, a very narrow ratio of water:monomer, for example 1.2 to 3:1, may be used in the polymerization, without disadvantages in working occurring.

The process of the invention is in the first place applicable to the polymerization of vinyl chloride. In addition to vinyl chloride, 0.5 to 50% of one or several other monomers that are copolymerizable with vinyl chloride may be used, for example vinyl esters such as vinyl acetate, acrylic acid esters, methacrylic acid esters, maleic acid esters, fumaric acid esters, or acrylonitrile.

As catalysts there may be used virtually all compounds that decompose on heating with formation of radicals, for example peroxides, peracids, hydroperoxides or azo compounds. Advantageously, organically soluble catalysts are used, for example benzoyl peroxide, lauroyl peroxide, diisopropyl percarbonate or azoisobutyric acid dinitrile.

The polymerization is carried out at a temperature normally used in suspension polymerization, i.e. at about 30 to about 80° C., advantageously 40 to 60° C.

The following examples serve to illustrate the invention but they are not intended to limit it thereto, the parts being by weight.

*Example 1 (comparison test)*

In a polymerization medium consisting of 150 parts of water and 0.5 part of polyethylene glycol of a molecular weight of 25,000 as dispersant, 100 parts of vinyl chloride were polymerized at 53° C. in the presence of 0.3% of lauroyl peroxide. After 12 hours the pressure had dropped to 5 atmospheres (gage). 91 parts of polymer were obtained, of which 58 parts adhered as a solid deposit to the wall of the polymerization vessel. The remaining pulverulent product possessed an absorptive capacity for plasticizer of 26 grams. To determine the absorptive capacity for plasticizer, an excess amount of dioctyl phthalate was allowed to act at 20° C. for 10 minutes on a sample of the polymer. After that time the proportion of plasticizer that had not been absorbed by the polymer was removed by centrifuging. The amount of plasticizer absorbed is indicated in grams per 100 grams of polymer.

*Example 2*

The polymerization was carried out under the conditions of Example 1 with the exception that a polyethylene glycol was used on to which 25% of vinyl acetate had been grafted and which had an interfacial tension of 44.8 dyn./cm. in an aqueous solution of 0.5% strength. After 9½ hours, 87 parts of a polymer of porous structure were obtained. 100 grams of the polymer absorbed 38 grams of plasticizer in the cold. Only slight formation of deposits occurred.

*Example 3*

The polymerization was carried out as described in Example 1 or 2 with the exception that a polyethylene glycol on to which 37% of vinyl acetate had been grafted and which had an interfacial tension of 43.5 dyn./cm. in an aqueous solution of 0.5% strength was used as a dispersant.

After 7½ hours, 66.6 parts of a pulverulent polymer of porous structure and 15 parts of deposit were obtained. 100 grams of the polyvinyl chloride so obtained absorbed 35 grams of plasticizer.

*Example 4*

The polymerization was carried out as described in Example 1 with the exception that an oxethylated polypropylene glycol on to which 50% of vinyl acetate had been grafted was used as a dispersant.

After 10½ hours, 85 parts of a fine-grained polymer of porous structure were obtained, Only slight formation of deposits occurred. The absorption of plasticizer amounted to 29 grams.

*Example 5*

The polymerization was carried out as described in Example 1 with the exception that an oxethylated polypropylene glycol on to which 50% of vinyl propionate had been grafted was used as a dispersant.

After 8 hours, 89 parts of a porous polymer were obtained. The absorption of plasticizer amounted to 26 grams.

*Example 6*

The polymerization was carried out under the conditions and with the proportions described in Example 1 with the exception that an oxethylated polypropylene glycol on to which 50% of vinyl butyrate had been grafted was used as a dispersant.

After 8½ hours, 87 parts of a porous polymer were obtained. The absorption of plasticizer amounted to 25 grams.

We claim:

1. In a process for polymerizing a member selected from the group consisting of vinyl choride and a mixture of vinyl chloride with 0.5 to 50% by weight, calculated on the mixture, of another monomer copolymerizable with vinyl chloride in aqueous suspension and in the presence of a free radical-liberating catalyst and a dispersant, the improvement which comprises using, as a dispersant, 0.01% to 2% by weight of monomer of a modified polyether graft copolymer having a polyalkylene glycol backbone and from 10% to 50% by weight of a vinyl compound selected from the group consisting of vinyl acetate, vinyl propionate, vinyl butyrate, vinyl octoate, acrylic esters and methacrylic esters grafted thereon whereby a polymeric product of said vinyl chloride in particulate form having a porous structure is obtained.

2. In the process of claim 1 the step which comprises using as dispersants polyalkylene glycols onto the chains of which 15 to 35% by weight of said vinyl compound have been grafted.

3. In the process of claim 1 the step which comprises using as a dispersant a polyalkylene glycol on to which at least one member selected from the group consisting of vinyl acetate and vinyl propionate has been grafted.

4. In the process of claim 1 the step which comprises using as a dispersant a polyethylene glycol on to the chain of which 15 to 35% of vinyl acetate has been grafted.

5. In the process of claim 1 the step which comprises using as a dispersant a polyalkylene glycol whose terminal hydroxyl groups have been esterified and on to the chain of which said vinyl compound has been grafted.

6. In the process of claim 1 the step which comprises using as a dispersant a polyalkylene glycol whose terminal hydroxyl groups have been etherified and on to the chain of which said vinyl compound has been grafted.

7. In the process of claim 1 the step which comprises using as a dispersant an oxethylated polyethylene glycol on to the chain of which at least one member selected from the group consisting of vinyl acetate and vinyl propionate has been grafted.

8. In the process of claim 1 the step which comprises using as a dispersant an oxethylated polypropylene glycol on to the chain of which 20 to 50% of vinyl acetate has been grafted.

9. In the process of claim 1 the step which comprises using as a dispersant a graft polymer of a molecular weight of about 1,000 to about 40,000.

10. In the process of claim 1 the step which comprises using as a dispersant a graft polymer of a molecular weight of 10,000 to 30,000.

11. In the process of claim 1 the step which comprises using 0.1% to 1% of dispersant, based on the weight of the monomers, for the polymerization.

12. In the process of claim 1 the step which comprises using a monomer-soluble peroxide as a polymerization catalyst.

13. In the process of claim 1 the step which comprises copolymerizing vinyl chloride with 0.5 to 50% by weight, calculated on the total of the monomers used, of a member selected from the group consisting of vinyl acetate, acrylic acid esters, methacrylic acid esters, maleic acid esters, fumaric acid esters and acrylonitrile.

(References on following page)

References Cited by the Examiner

UNITED STATES PATENTS

| | | | |
|---|---|---|---|
| 2,729,627 | 1/1956 | Carr | 260—92.8 |
| 3,033,841 | 5/1962 | Germain | 260—89.1 |
| 3,058,940 | 10/1962 | Rees | 260—29.6 |

FOREIGN PATENTS 612,883   1/1961   Canada.

OTHER REFERENCES

Schildknecht, "Polymer Process," vol. X, pp. 91–109, Interscience (1956), TP 156 P6 S3 C.4.

JOSEPH L. SCHOFER, *Primary Examiner.*

HAROLD N. BURSTEIN, *Examiner.*

J. C. MARTIN, J. F. McNALLY, H. WONG,
*Assistant Examiners.*